United States Patent [19]

Pietryk et al.

[11] Patent Number: 4,679,983
[45] Date of Patent: Jul. 14, 1987

[54] WATER PUMP FOR WINDOW WASHER UNIT

[75] Inventors: Erwin Pietryk, Cologne; Axel Rauthmann, Pulheim, both of Fed. Rep. of Germany

[73] Assignee: Ford Motor Company, Dearborn, Mich.

[21] Appl. No.: 883,449

[22] Filed: Jul. 10, 1986

Related U.S. Application Data

[63] Continuation of Ser. No. 594,517, Mar. 29, 1984, abandoned.

[30] Foreign Application Priority Data

May 11, 1983 [DE] Fed. Rep. of Germany ....... 3317155

[51] Int. Cl.$^4$ .............................................. F01D 1/30
[52] U.S. Cl. .................... 415/152 A; 415/148; 415/209; 415/146; 137/625.46; 137/876
[58] Field of Search ............... 415/152 R, 152 A, 146, 415/148, 35, 46, 205, 209; 137/876, 625.46, 625.47

[56] References Cited

U.S. PATENT DOCUMENTS

| | | |
|---|---|---|
| 1,765,984 | 6/1930 | Kocourek et al. ................ 137/876 |
| 2,166,758 | 7/1939 | Franck ............................... 415/152 |
| 2,838,002 | 6/1958 | Cohen ................................ 415/146 |
| 3,040,663 | 6/1962 | Cushing ......................... 415/152 A |
| 3,190,584 | 6/1965 | Gire et al. .................... 137/625.46 |
| 3,373,771 | 3/1968 | Boyen ........................... 137/625.47 |
| 3,421,704 | 1/1969 | Peyer et al. .................. 415/152 A |
| 4,057,373 | 11/1977 | Schwing ...................... 137/625.46 |
| 4,091,644 | 5/1978 | Bochan ............................. 415/146 |
| 4,331,295 | 5/1982 | Warihashi .................... 415/152 R |

FOREIGN PATENT DOCUMENTS

| | | |
|---|---|---|
| 1058381 | 5/1959 | Fed. Rep. of Germany . |
| 2334390 | 1/1975 | Fed. Rep. of Germany . |
| 2434492 | 1/1976 | Fed. Rep. of Germany . |
| 2818582 | 11/1978 | Fed. Rep. of Germany . |
| 3023897 | 5/1982 | Fed. Rep. of Germany . |
| 1142593 | 9/1957 | France ............................... 415/146 |
| 12589 | of 1896 | United Kingdom ............... 415/152 |

Primary Examiner—Robert E. Garrett
Assistant Examiner—John Kwon
Attorney, Agent, or Firm—Daniel M. Stock; Clifford L. Sadler

[57] ABSTRACT

The invention relates to a water pump for a window washer unit of a vehicle. The pump has a reversible motor, one inlet port and two outlet ports and is arranged to deliver water selectively to either one of the two outlet ports in dependence upon the direction of rotation of the motor.

2 Claims, 2 Drawing Figures

WATER PUMP FOR WINDOW WASHER UNIT

This application is a continuation of application Ser. No. 594,517, filed Mar. 29, 1984, now abandoned.

BACKGROUND OF THE INVENTION

The invention relates to a water pump for a window washer unit of a vehicle, the pump having a reversible motor, one inlet port and two outlet ports and being arranged to deliver water selectively to either one of the two outlet ports in dependence upon the direction of rotation of the motor, wherein the pump comprises an impeller rotatable in a pump housing and a valve body surrounding the impeller and movable in dependence upon the direction of rotation of the motor to close the other of the two outlet ports.

Window washer unit for vehicles are already known from DE OS Nos. 23 34 390 and 24 34 492, which comprise separate spray nozzles for the windscreen and rear window and only one water pump which is reversible in its direction of rotation and has one inlet port and two outlet ports. The reversible water pump is connected in such a way that the two separate spray nozzle systems are selectively actuated in dependence upon the direction of rotation of the pump, non-return valves disposed in the hose pipes or arranged directly in the outlet ports ensuring that water is only sprayed from one of the two nozzles systems.

DE PS 30 23 897 discloses a further window washer unit of a vehicle, in which, instead of non-return valves being arranged at the outlet ports, a drive wheel is disposed concentrically with the impeller of the water pump and has a radially projecting extension which forms a flap valve serving to close the outlet ports alternately as a function of the direction of rotation of the water pump, the drive wheel being rotated by hydrodynamic forces.

This known device has the disadvantage that the drive wheel causes a deterioration in the efficiency of the pump since eddies arise on the driving webs provided on the drive wheel.

A water pump is known from DE OS 28 18 582, in which a valve body in the form of a drum disposed concentrically with the impeller of the water pump is driven by the drive shaft of the pump either directly or with the interposition of gearing, in order to leave one outlet port free intermittently.

SUMMARY OF THE INVENTION

The present invention seeks to provide an improved water pump for a window washer unit which enables a reliable reversing of the valve body position as a function of the direction of rotation of the water pump to be achieved simply and without adversely affecting the pumping efficiency.

According to the present invention, there is provided a water pump for a window washer unit of a vehicle, the pump having a reversible motor, one inlet port and two outlet ports and being arranged to deliver water selectively to either one of the two outlet ports in dependence upon the direction of rotation of the motor. The pump comprises an impeller rotatable in a pump housing and a valve body surrounding the impeller and movable in dependence upon the direction of rotation of the motor to close the other of the two outlet ports. The valve body is in the form of a drum having a slotted hub which is urged by a clamping ring into frictional engagement with the drive shaft to constitute a slipping clutch, and the outer surface of the drum has at least one radially projecting stop cooperating with abutments in the pump housing to define predetermined end positions for the drum in which a radial opening in the drum is selectively aligned with one or the other of the two outlet ports.

Because the drum is connected to the drive shaft by way of a slipping clutch in the form of a slotted hub and because the stops limiting the rotation of the drum are disposed on its outer surface, a more advantageous layout of the pump chamber in the vicinity of the impeller is made possible and in this way the efficiency of the water pump is improved.

Preferably, the outer surface of the drum has two stops extending into respective recesses in the pump housing, the stops being arranged at the opposite ends of the radial opening in the drum. In this way, the stops assist in sealing off the outlet port which is not in use at any one time.

BRIEF DESCRIPTION OF THE DRAWINGS

The invention will now be described further, by way of example, with reference to the accompanying drawings, in which.

DESCRIPTION OF A PREFERRED EMBODIMENT

Figure 1:
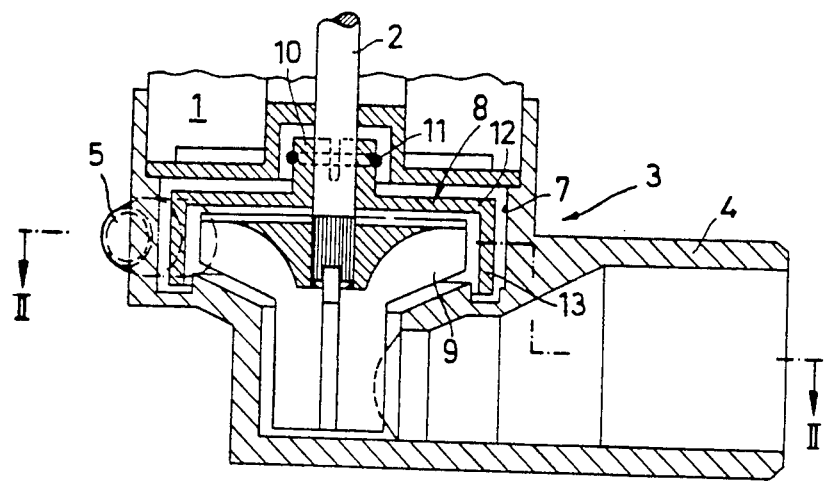
FIG. 1 is a vertical section through the pump chamber of a water pump according to the invention.
Figure 2:
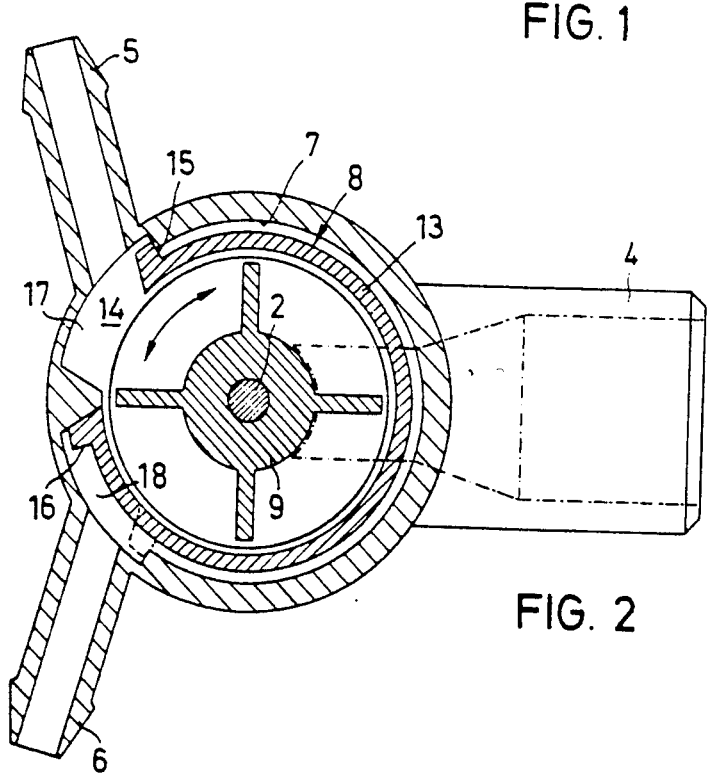
FIG. 2 is a section along the line II—II in FIG. 1.

The water pump shown in FIGS. 1 and 2 comprises an electric motor 1 with a drive shaft 2 which projects into the interior of a pump housing 3 by way of a conventional seal not shown in detail.

The pump housing 3 comprises one inlet port 4 and two outlet ports 5 and 6, of which one, for example 5, delivers water to the spray nozzles of a windscreen and the other, for example 6, delivers water to the spray nozzles of a rear window.

The pump housing 3 comprises an essentially cylindrical pump chamber 7, in which a valve body 8 and an impeller 9 are arranged concentrically to the drive shaft 2. The impeller 9 is provided with blades in conventional manner and is connected for rotation with the drive shaft 2.

The valve body 8 is made in the form of a drum, which comprises a slotted hub 10 with a clamping ring 11, a base plate 12 and a cylindical outer surface 13.

The outer surface 13 is provided with a radial opening 14 which is adjoined by two radially outwardly projecting stops 15 and 16 which can in a defined sector in corresponding recesses 17 and 18 in the pump housing 3.

The slotted hub 10 mounted on the drive shaft 2 in conjunction with the clamping ring 11 represents an extremely simple slipping clutch which, when rotated, for example in the clockwise direction, entrains the valve body 8 until the corresponding stop 15 bears against the end of the corresponding recess 17 in the pump housing 3. In this way, the opening 14 in the outer surface 13 of the valve body 8 is made to coincide with the corresponding outlet port 5, whereas the other outlet port 6 is blocked by part of the outer surface 13.

If the direction of rotation of the drive shaft 2 is now changed, when rotation occurs in the anti-clockwise direction, for example, the slipping clutch entrains the valve body 8 until the other stop 16 comes to bear against the end of the recess 18, so that the opening 14 in the outer surface 13 of the valve body 8 comes to coincide with the other outlet port 6, while the former outlet port 5 is closed by part of the outer surface 13. In this way a reliable change-over of the corresponding outlet ports 5 and 6, respectively, is ensured following a reversal of the direction of rotation of the drive shaft 2 and an improvement in the pumping efficiency is achieved on account of the outer surface 13 being in close proximity to the impeller 9.

We claim:

1. A water pump for a window washer unit of a vehicle, the pump having a reversible motor, one inlet port and two outlet ports and being arranged to deliver water selectively to either one of the outlet ports in dependence upon the direction of rotation of the motor, wherein the pump comprises an impeller rotatable in a pump housing and a valve body surrounding the impeller, defining the outer periphery of the pump outlet from the impeller, and movable in dependence upon the direction of rotation of the motor to close the other of the two outlet ports, the valve body being in the form of a drum having a slotted hub which is urged by a clamping ring into frictional engagement with the drive shaft to constitute a slipping clutch, and the outer surface of the drum having at least one radially projecting stop cooperating with abutments in the pump housing to define predetermined end positions for the drum in which a radial opening in the drum is selectively aligned with one or the other of the two outlet ports and the remaining outlet port is closed off by the drum.

2. A water pump as claimed in claim 1, wherein the outer surface of the drum has two stops extending into respective recesses in the pump housing, the stops being arranged at the opposite ends of the radial opening in the drum.

* * * * *